United States Patent [19]

Kashima et al.

[11] Patent Number: 5,018,483
[45] Date of Patent: May 28, 1991

[54] FUEL INJECTION QUANTITY CONTROL DEVICE FOR ALCOHOL ENGINE

[75] Inventors: Takamitau Kashima, Musashino; Hitoshi Monden, Mitaka, both of Japan

[73] Assignee: Fuji Jukogyo Kabushiki Kaisha, Tokyo, Japan

[21] Appl. No.: 598,559

[22] Filed: Oct. 16, 1990

[30] Foreign Application Priority Data

Oct. 24, 1989 [JP] Japan .................. 1-278187

[51] Int. Cl.$^5$ .................. F02D 19/08; F02D 41/04
[52] U.S. Cl. .................. 123/1 A; 123/478; 123/575
[58] Field of Search .............. 123/1 A, 478, 492, 494, 123/575

[56] References Cited

U.S. PATENT DOCUMENTS

| | | | |
|---|---|---|---|
| 3,868,936 | 3/1975 | Rivere | 123/445 |
| 4,242,992 | 1/1981 | Kawamura et al. | 123/491 |
| 4,418,672 | 12/1983 | Muller et al. | 123/478 |
| 4,495,930 | 1/1985 | Nakajima | 123/1 A X |
| 4,546,732 | 10/1985 | Mae et al. | 123/1 A |
| 4,612,904 | 9/1986 | Tadokoro et al. | 123/492 |
| 4,883,039 | 11/1989 | Toshimitsu et al. | 123/492 X |

*Primary Examiner*—Tony M. Argenbright
*Attorney, Agent, or Firm*—Beveridge, DeGrandi & Weilacher

[57] ABSTRACT

A fuel injection control device is provided for a flexible fuel vehicle alcohol engine to be driven with a mixed fuel consisting of gasoline and alcohol. The engine includes a port injector provided at each cylinder and an intake pipe assembly portion injector commonly provided for all the cylinders. The control device defines such a fuel injection pulse width as enabling the operation of the injector in dependency on the alcohol density and the engine state. It drives only the intake pipe assembly portion injector to inject the fuel if the pulse width is smaller than a predetermined value or adds the fuel injection of the port injector to that if it is larger.

3 Claims, 7 Drawing Sheets

FUEL INJECTION QUANTITY CONTROL DEVICE FOR ALCOHOL ENGINE

BACKGROUND OF THE INVENTION

1. Field of the Invention

The present invention relates to a fuel injection quantity control device for an alcohol engine, which device is designed to switch a fuel-injecting mode according to a fuel injection pulse width variably arranged based on an alcohol density.

2. Description of the Related Art

Recently, there has been developed an alcohol engine dedicated for a flexible fuel vehicle (FFV) (referred to as an FFV alcohol engine) in order to meet the requirement for reduction of fuel consumption or purification of exhaust air. The alcohol engine can be driven by not only a gasoline fuel but also an alcohol fuel or a mixed fuel consisting of gasoline and alcohol.

The FFV alcohol engine is normally controlled to correct a fuel injection pulse width according to an alcohol density contained in the used fuel for keeping a theoretical air/fuel ratio. The alcohol density is sensed by an alcohol sensor. One example of the FFV alcohol engine is disclosed in the Official Gazette of Japanese Laid-open No. 58-28557.

However, it has turned out that the theoretical air/fuel ratio sensed in case of using 100%-alcohol fuel is about half as high as that sensed in case of using a 100%-gasoline fuel. As the alcohol density becomes higher in the fuel, therefore, the theoretical fuel/air ratio becomes lower.

In the FFV alcohol engine, hence, the fuel injection quantity given in case of using a 100%-alcohol (0%-gasoline) fuel is about twice as large as that given in case of using 0%-alcohol (100%-gasoline) fuel even under the same driving condition.

If a normal injector nozzle diameter is expanded to double the fuel injection quantity, the alcohol engine entails a shorter fuel injection pulse width, that is, valve-opening time in a low-load engine driving area such as idling drive when the engine uses the 0%-alcohol (100%-gasoline) fuel. It results in the fuel injection quantity of the injector showing variations in fuel injection quantity and worsening a fuel atomization characteristic, thereby making the engine combustion unstable.

If, on the other hand, the normal injector nozzle is not improved, the alcohol engine is required to have a doubled fuel injection pulse width when it uses the 100%-alcohol fuel. Assuming that it is a four-cycle engine, the normally-feasible maximum fuel injection pulse width $T_{MAX}$ matches to a one-cycle (720° CA) passage time, that is, $T_{MAX} = (60/N) \times 2$ sec. It means that the actual maximum fuel injection pulse width $T_{MAX}$ is made shorter than that, because it is necessary to consider the fuel injection timing at the next cycle.

The maximum fuel injection pulse width $T_{MAX}$, however, is variable on the number of revolutions of an engine. In the driving area where the engine is subject to high rotation and load, thus, the engine may be short of the fuel injection quantity even if the injector is fully opened, thereby lowering its output and driveability.

The FFV alcohol engine requires a wide dynamic range from a minimum fuel quantity consumed in the idling drive with a 100%-gasoline fuel to a maximum fuel injection quantity consumed in the maximum with a 100%-alcohol fuel. Actually, the dynamic range required in the FFV alcohol engine is about twice as wide as that required in the normal engine. There exists large difficulty in developing such an injector to satisfy the requirement. The developed injector results in being a special product, thereby greatly raising the overall cost of the engine.

SUMMARY OF THE INVENTION

An object of the present invention is to provide a fuel injection quantity control device of an alcohol engine which device is capable of properly arranging a fuel injection quantity required in the overall driving area ranging from a 100%-gasoline fuel to a 100%-alcohol one in a manner to stabilize combustion of the engine.

In carrying out the object in a preferred mode, the present invention provides a fuel injection quantity control device of an alcohol engine which can be driven by a mixed fuel consisting of gasoline and alcohol. The fuel injection quantity control device includes a plurality of cylinders, port injectors respectively facing to air intake ports of the cylinders, and one intake pipe assembly injector provided in an intake pipe assembly portion and is designed to control the fuel injection quantity by controlling the injection quantity of the injector. The fuel injection quantity control device comprises:

a crank angle sensor mounted in an engine, an engine revolution number calculator for obtaining the number of revolutions based on the output of the crank angle sensor, a port injector maximum fuel injection pulse width control section for defining a maximum fuel injection pulse width of the port injector based on the number of revolutions of the engine, a density sensor for sensing an alcohol density in the fuel, a parameter sensor for sensing a parameter indicating the state of the engine, a fuel injection pulse width control section for defining a fuel injection pulse width according to the outputs of the density sensor and the parameter sensor, a port injector injection ability determining section for comparing the fuel injection pulse width with the maximum fuel injection pulse width and determining whether or not the fuel injection pulse width is shorter than the maximum fuel injection pulse width, an injector fuel injection pulse width control section dedicated for an intake pipe assembly portion for defining a fuel injection pulse width of the intake pipe assembly portion for the intake pipe assembly portion injector according to the difference between the fuel injection pulse width and the maximum fuel injection pulse width if the determining section determines the fuel injection pulse width is longer than the maximum fuel injection pulse width, and an injector selector for supplying the fuel injection pulse width defined in the fuel injection pulse width control section to the port injector if the determining section determines that the fuel injection pulse width is shorter than the maximum fuel injection pulse width, supplying the maximum fuel injection pulse width to the port injector and the intake pipe assembly portion injector fuel injection pulse width to the intake pipe assembly portion injector if the determining section determines that the fuel injection pulse width is longer than the maximum fuel injection pulse width.

The fuel injection quantity control device operates to derive the number of revolutions of an engine based on the output signal of the crank angle sensor and define a maximum fuel injection pulse width of the port injector facing to the intake port of each cylinder based on the number of revolutions of the engine.

And, the device operates to define the fuel injection pulse width based on the output signals of the alcohol density sensor and the engine state parameter sensor, compare the fuel injection pulse width with the maximum fuel injection pulse width, and determine if the fuel injection pulse width is shorter than the maximum fuel injection pulse width.

If it is determined that the fuel injection pulse width is longer than the maximum fuel injection pulse width, the control device serves to define the intake pipe assembly portion injector fuel injection pulse width to the intake pipe assembly portion injector facing to the intake pipe assembly portion according to the difference between the fuel injection pulse width and the maximum fuel injection pulse width.

Then, if it is determined that the fuel injection pulse width is shorter than the maximum fuel injection pulse width, the control device serves to supply the fuel injection pulse width to the port injector. If it is determined reversely, it serves to supply the maximum fuel injection pulse width to the port injector and the fuel injection pulse width for the intake pipe assembly portion injector to the intake pipe assembly portion injector.

Further objects and advantages of the present invention will be apparent from the following description of the preferred embodiments of the invention as illustrated in the accompanying drawings.

BRIEF DESCRIPTION OF THE PREFERRED EMBODIMENTS

Figure 6:
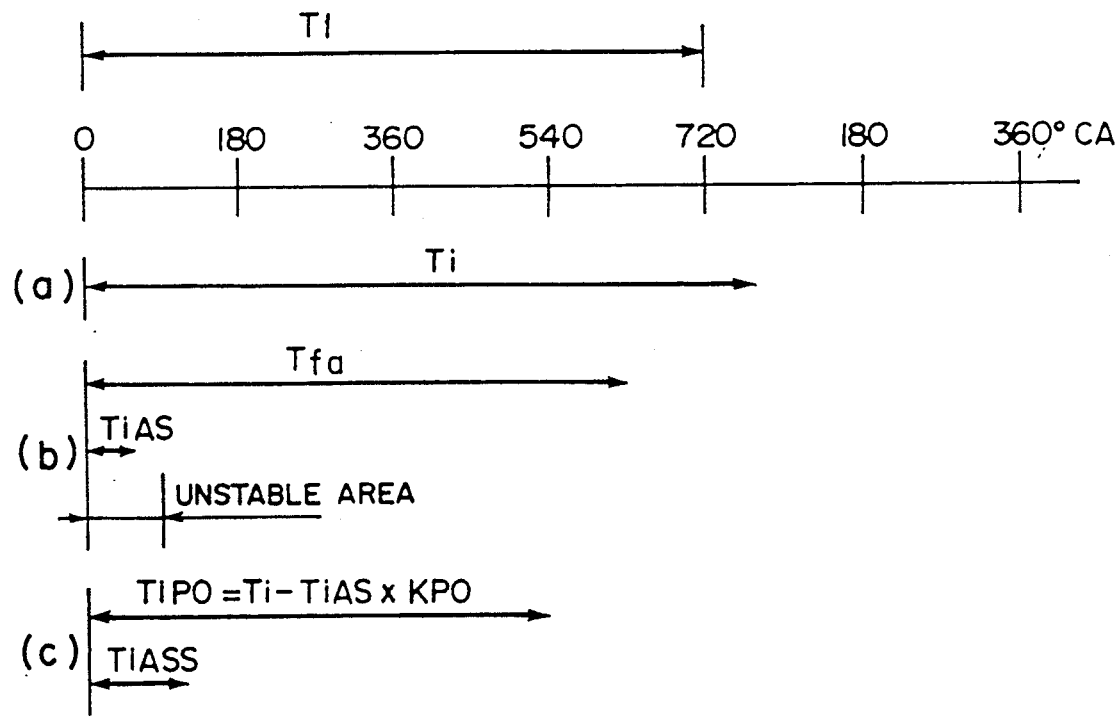
Figure 7A:
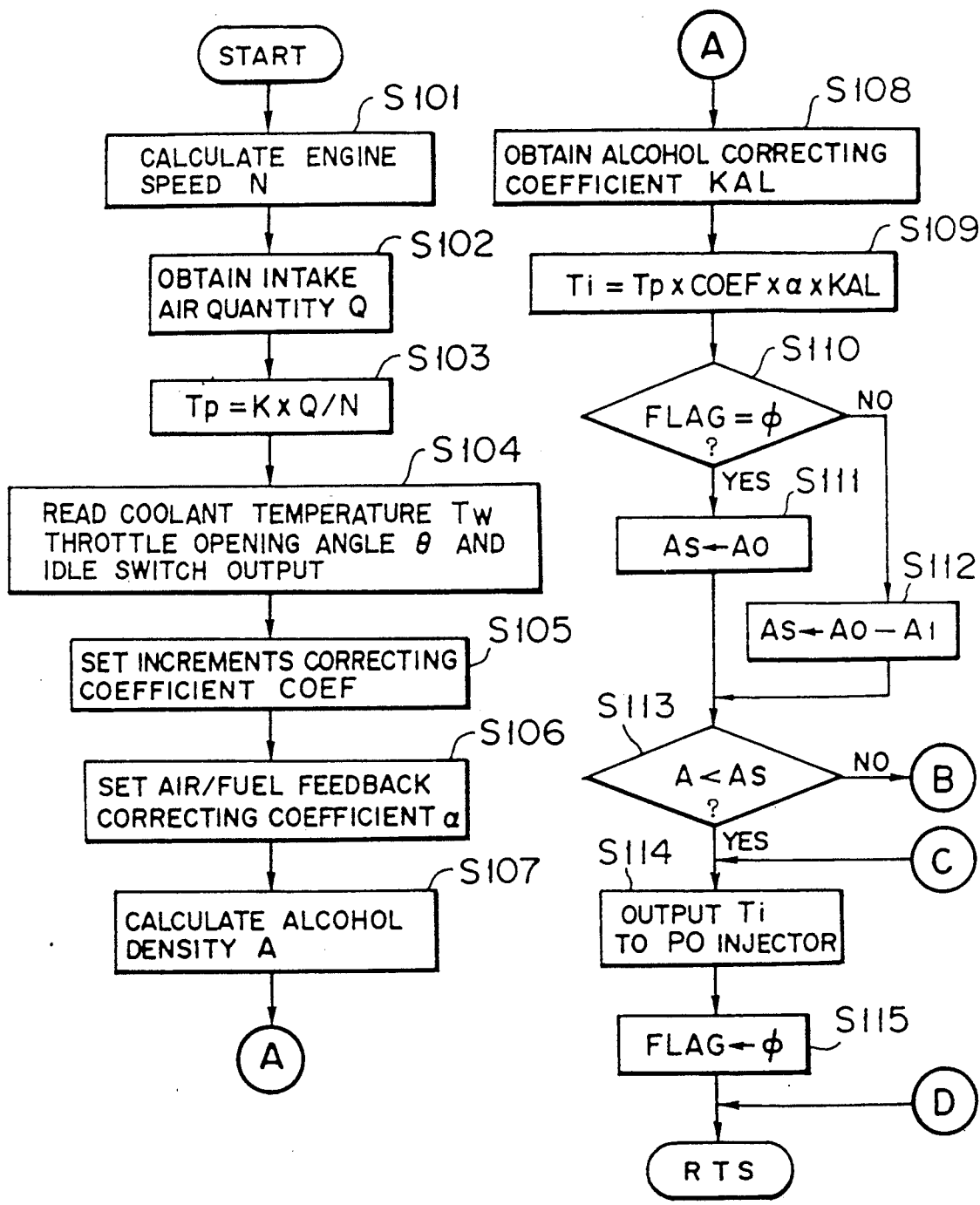
Figure 7B:
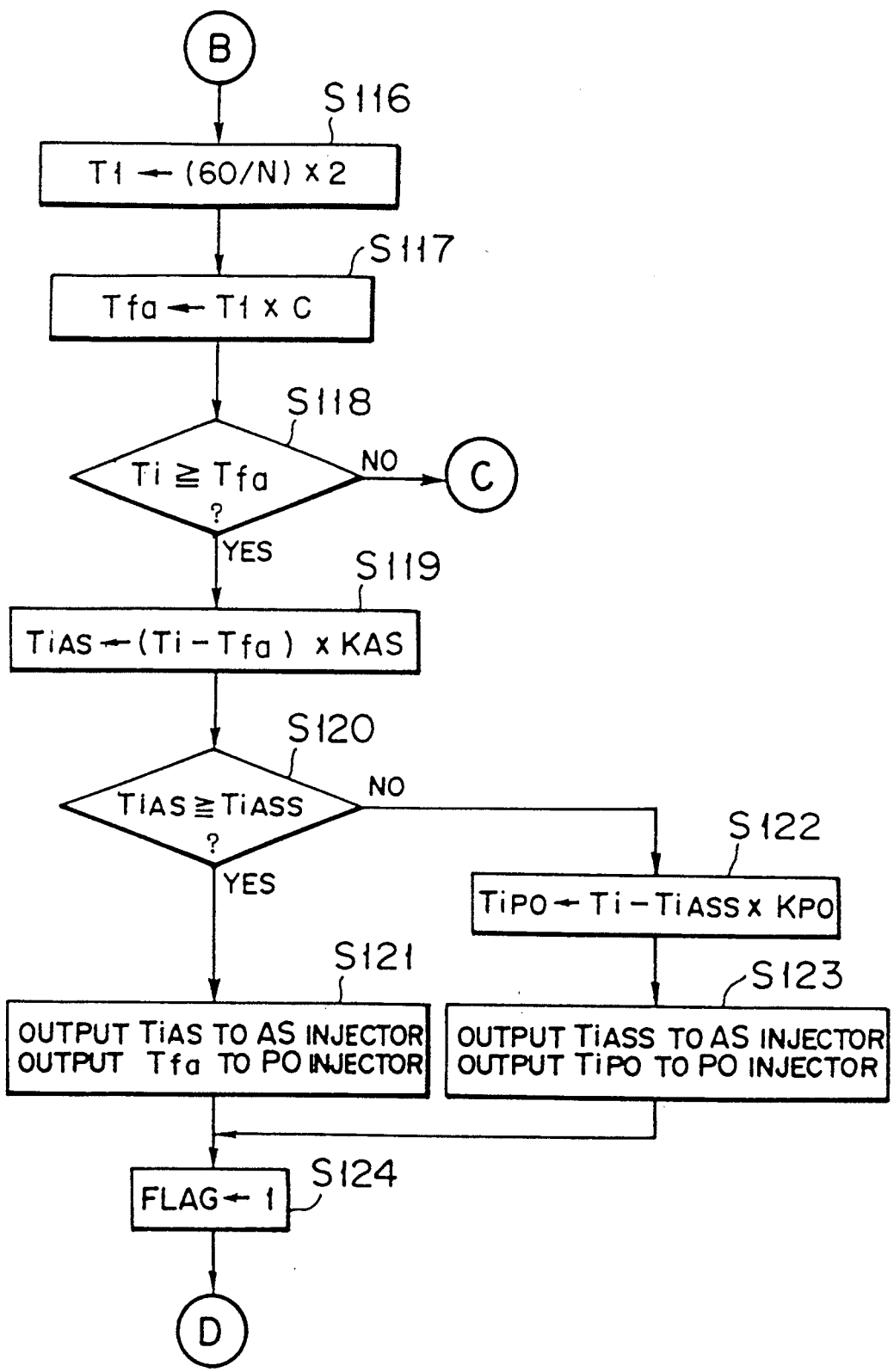

FIGS. 5(a) and 5(b) illustrate how a fuel injection pulse width is distributed to a port injector and an intake pipe assembly portion injector if a fuel injection pulse width is longer than a maximum fuel injection pulse width of a port injector;

FIGS. 6(a), 6(b) and 6(c) illustrate how a fuel injection pulse is distributed if the fuel injection pulse width is longer than the maximum fuel injection pulse width of the port injector and the fuel injection pulse width of the intake pipe assembly portion injector stays within an unstable area; and FIGS. 7(a) and 7(b) are flowcharts illustrating how the fuel injection quantity is controlled.

A preferred embodiment of the present invention will become understood from the following detailed description referring to the accompanying drawings.

DESCRIPTION OF THE PREFERRED EMBODIMENT

Figures 1, 1A:
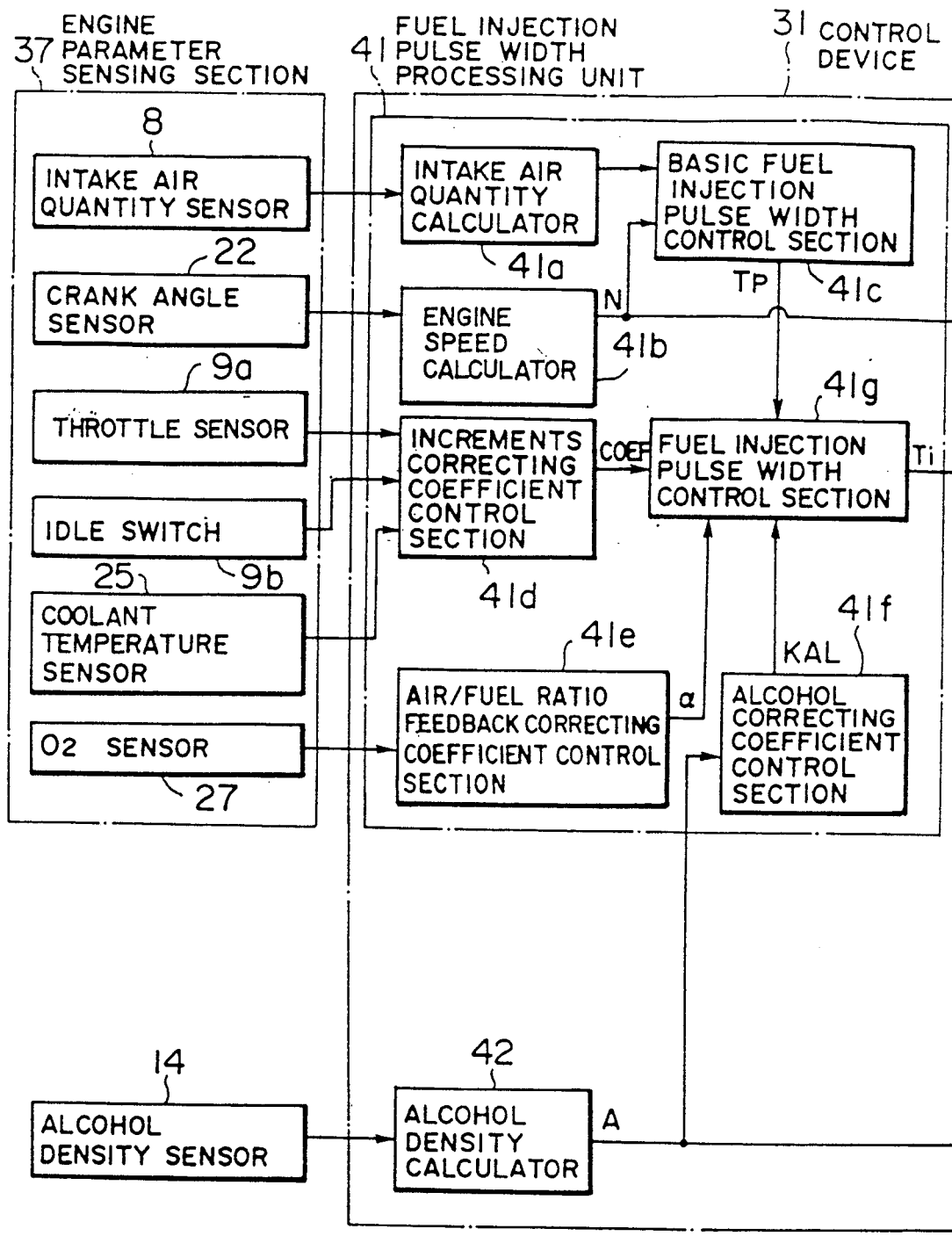
FIGS. 1, 1A and 1B are a function block diagram showing a fuel injection control device according to an embodiment of the invention.
Figure 1B:
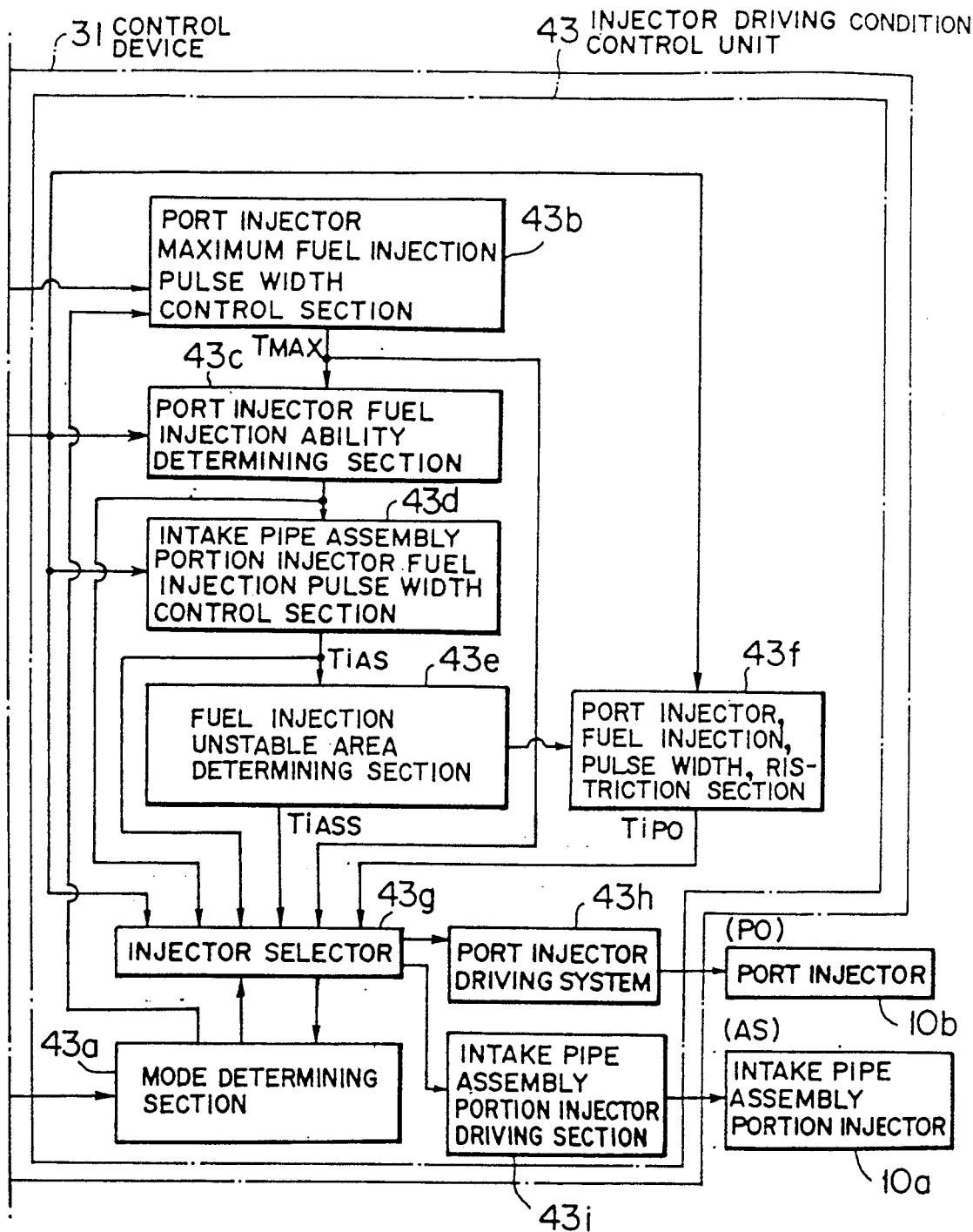
Figure 2:
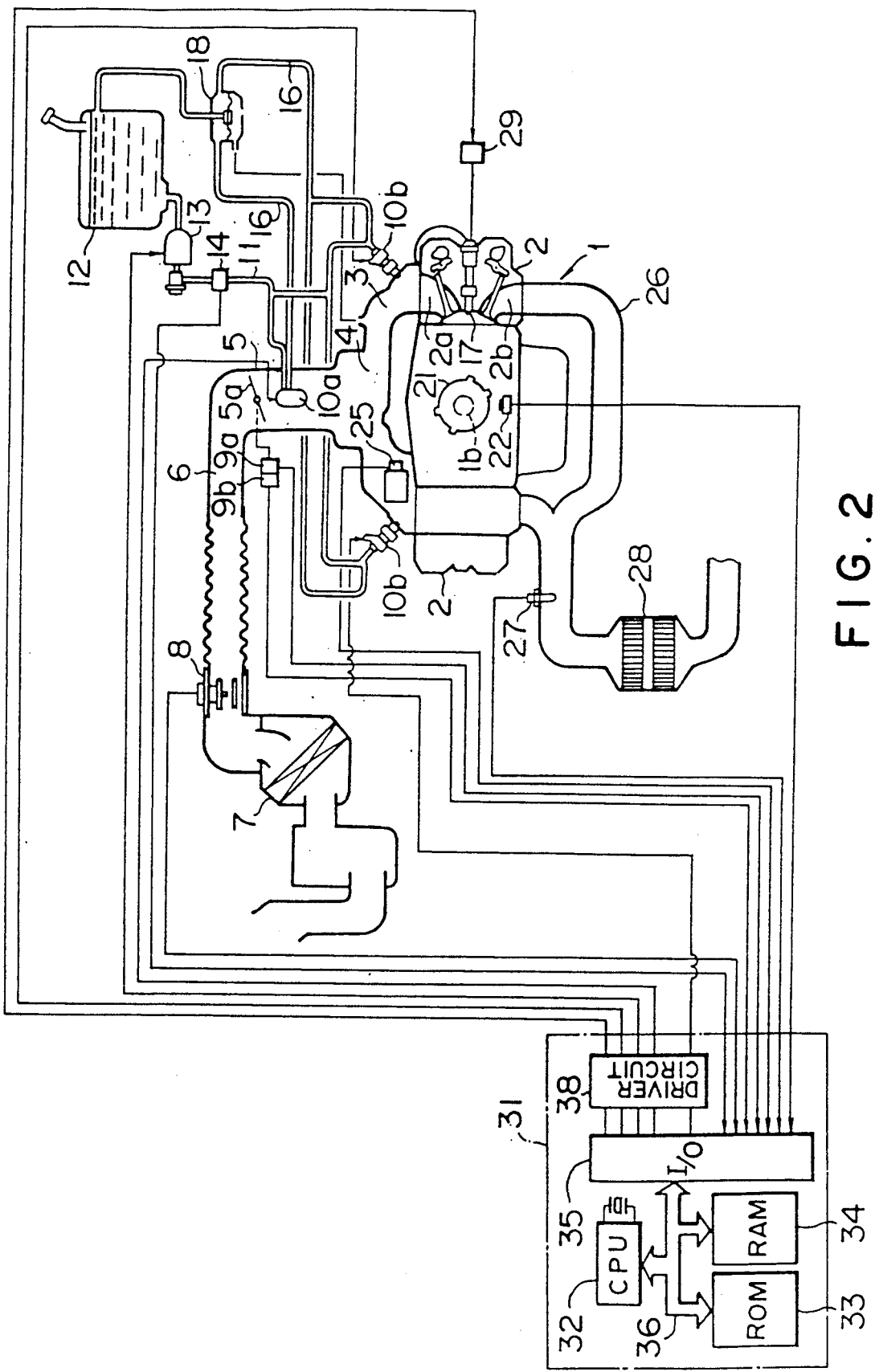
FIG. 2 is a view schematically showing an engine control system according to the embodiment of the invention.

As shown in FIG. 2, 1 denotes a horizontal opposed type four-cycle FFV alcohol engine.

The engine 1 includes a cylinder head 2 having an intake port 2a formed thereon. The intake port 2a communicates with an intake manifold 3, the upstream side of which communicates with a throttle chamber 5 through an air chamber 4. The upstream side of the throttle chamber 5 is mounted with an air cleaner 7 through an intake pipe 6.

The downstream side of the air cleaner 7 has an intake air quantity sensor (hot wire type air flowmeter viewed in FIG. 2) 8 inserted thereon. The throttle chamber 5 provides a throttle valve 5a which communicates with a throttle opening sensor 9a and an idle switch 9b for sensing that the throttle valve is fully closed.

At the downstream side of the throttle valve 5a, the assembly portion of the intake manifold 3 provides an assembly portion injector (referred to as "AS injector") 10a. Each intake port 2a provided at each cylinder of the intake manifold 3 includes a port injector ("PO injector") located at the upstream side of the intake port 2a.

The injectors 10a, 10b use conventional gasoline engine single point injectors or multipoint injectors.

Communication is allowed among the AS injector 10a, the PO injector 10b and the fuel tank 12 through a fuel supply path 11 and a fuel return path 16. The fuel path 11 provides a fuel pump 13 and an alcohol density sensor 14 located in the order viewed in FIG. 2 from the fuel tank 12 side. The fuel return path 16 provides a pressure regulator 18 which serves to keep stable a difference between the combustion pressure exerted on the fuel supply path 11 and the inner pressure exerted on the intake manifold 3.

The fuel tank 12 stores some kinds of fuels containing only alcohol, a mixture of alcohol and gasoline or only gasoline. That is, it stores a fuel containing any alcohol density A (%) determined by a user when he supplies a fuel.

Each cylinder of the cylinder head 2 provides an ignition plug 17 mounted in a manner to allow its tip to be exposed to a combustion chamber. The engine 1 has a crank shaft 1b on which a crank rotor 21 is fitted. On the outer peripheral surface of the crank rotor 21 is provided a crank angle sensor 22 having an electromagnetic pickup for sensing a crank angle.

The intake manifold 3 has a cooling water path (not shown) serving as a riser formed thereon. A cooling water temperature sensor 25 is located to face to the cooling water path. The cylinder head 2 provides an exhaust port 2b which communicates with an assembly portion of an exhaust pipe 26 to which an 02 sensor 27 faces. And, a catalyst converter is denoted by a numeral 28.

Circuit Arrangement of Control Device

A control device denotes by 31 includes a central processing unit (CPU) 32, a ROM 33, a RAM 34 and an I/O interface, all of which are connected through a bus line 36. The I/O interface 35 provides an input port connected to an engine state parameter sensor 37. The parameter sensor 37 includes the sensors 8, 9a, 22, 25, 27 and an idle switch 9b.

The I/O interface 35 also provides an output port which is connected to the ignition plug 17 through an ignitor 29. And, the output port is also connected to the AS injector 10a, the PO injector 10b and the fuel pump 13.

The ROM 33 stores fixed data such as a control program. The RAM 34 stores a treated signal of the output of each sensor and the data processed in the CPU 32.

And, in accordance with the control program stored in the ROM 33, the CPU 32 serves to operate a fuel injection quantity and an ignition period based on an engine state parameter sensed by the engine state parameter sensor 37 and a fuel alcohol density sensed by the alcohol density sensor 14. Then, the CPU 32 supplies a driving pulse width signal to the AS injector 10a and the PO injector 10b and an ignition signal to the ignition plug 1.

Function Arrangement of the Control Device

As mentioned above, the control device has a function about the control of the fuel injection quantity. The function is realized by a fuel injection pulse width processing unit 41, an alcohol density calculator 42 and an injector driving section control unit 43.

The fuel injection pulse width processing unit 41 comprises an intake air quantity calculator 41a, an engine revolution number calculator 41b, a basic fuel injection pulse width control section 41c, a correcting coefficient control section 41d for various increments, an air/fuel ratio feedback correcting coefficient control section 41e, an alcohol quantity correcting coefficient control section 41f and a fuel injection pulse width control section 41g.

The injector driving section control unit 43 comprises an injector switching area determining section 43a, a port injector maximum fuel injector pulse width control section 43b, a port (referred to as "PO") injector fuel injection ability determining section 43e, an intake pipe assembly section (referred to as "AS"), an injector fuel injection pulse width control unit 43d, an AS injector fuel injection unstable area determining section 43e, a PO injector fuel injection pulse width control section 43f, an injector selector 43g, a PO injector driving section 43h and an AS injector driving section.

Function of Fuel Injection Pulse Width Operating Unit 41

The intake air quantity calculator 41a serves to calculate an intake air quantity Q based on an output signal of the intake air quantity sensor 8. And, the engine revolution number processing section 41b serves to calculate an engine revolution number N based on a crank pulse output from the crank angle sensor 22.

The basic fuel injection pulse width control section 41c serves to perform the operation ($T_p = K \times Q/N$ K: an inverse of a constant defined by a theoretical air/fuel ratio given in using the 100%-gasoline fuel, an injection quantity characteristic of the PO injector 10b and the number of cylinders) based on the intake air quantity Q calculated in the intake air quantity calculator 41a and the engine revolution number N calculated in the engine revolution number calculator 41b or perform map retrieval with the engine revolution number N and the intake air quantity Q as parameters for the purpose of setting the basic fuel injection pulse width $T_p$ of the PO injector 10b when using the 100%-gasoline fuel.

The basic fuel injection pulse width $T_p$ supplies the basic fuel injection time to the PO injector 10b. The basic fuel injection time is defined by the foregoing equation or the map retrieval with reference to the injection characteristic data of the PO injector 10b stored at a given address of the ROM 33.

The increments correcting coefficient control unit 41d reads a throttle opening ($\theta$) signal of the throttle opening sensor 9a, an ON/OFF signal of the idle switch 9b (ON indicates the throttle is closed up) and a cooling water temperature ($T_W$) signal of the cooling water temperature sensor 25, and defines increments correcting coefficients COEF about accelerating or decelerating correction, full-open increment correction, increment correction after idling and cooling water temperature correction based on the read data.

The air/fuel ratio feedback correcting coefficient control section 41e reads an output voltage of the O2 sensor 27 and compares the output voltage with a predetermined slice level for setting an air/fuel ratio feedback correcting coefficient $\alpha$ by the proportional integral control.

When the OS sensor 27 is inert, the section 41a serves to fix the air/fuel ratio feedback correcting coefficient $\alpha$ as $\alpha = 1.0$ and then cancel the air/fuel ratio feedback control.

The alcohol density calculator 42 reads an output signal of the alcohol density sensor 41 and calculates an alcohol density A of a fuel passed through the fuel supply path 11.

The alcohol correcting coefficient control section 41f serves to set an alcohol correcting coefficient KAL for correcting a lag of a theoretical air/fuel ratio resulting from the difference between the predetermined alcohol density A and that calculated by the alcohol density calculator 42.

For example, the theoretical air/fuel of a 100%-gasoline fuel is 14.9 and that of a 100%-alcohol (ethanol) fuel is 6.45 (9.01 in case of the 100%-ethanol fuel). As the alcohol density A of the fuel becomes higher, therefore, the theoretical air/fuel ratio becomes lower. The engine requires to increase the fuel injection quantity under the engine driving state.

Figure 3:
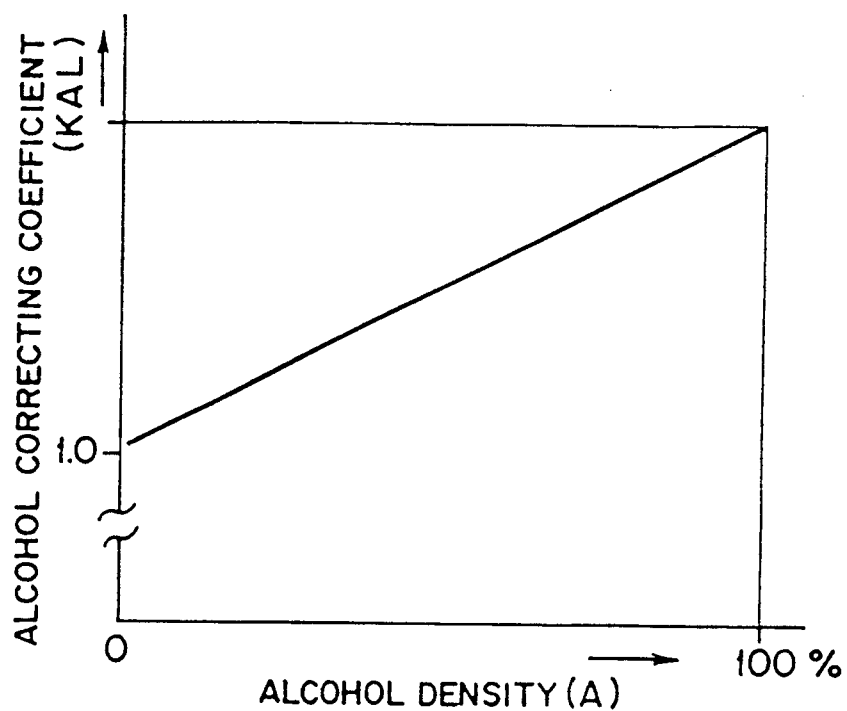
FIG. 3 is a graph showing relation between an alcohol density and an alcohol correcting coefficient according to the embodiment of the invention.

In the present embodiment, the basic fuel injection pulse width $T_p$ is assumed as an alcohol density $A = 0\%$ (gasoline 100%). Assuming that $KAL = 1.0$ is given in case of the alcohol density $A = 0\%$, the alcohol correcting coefficient KAL is obtained by a function of the alcohol density A shown in FIG. 3. As will be apparent from the function, the coefficient KAL increases in proportion to the increase of the alcohol density A ($KAL = f(A)$). The alcohol correcting coefficient KAL is used for correcting a lag of a theoretical air/fuel ratio resulting from the actual alcohol density A.

Assuming that the theoretical air/fuel ratio given in case of using the 100%-gasoline fuel is 14.9 and thus that given in case of using the 100%-alcohol (ethanol) fuel is 6.45, the alcohol correcting coefficient KAL is 2.3 ($KAL = 1.7$ given in case of the 100%-ethanol fuel). Under the same driving state, the fuel injection quantity given in case of the 100%-alcohol fuel is about twice as large as that given in case of the 100%-gasoline fuel.

The fuel injection pulse width control section 41g serves to correct the basic fuel injection pulse width $T_p$ defined by the basic fuel injection pulse width control section 41c based on the increment correcting coefficient COEF defined by the increment correcting coefficient control section 41d and the alcohol correcting coefficient KAL defined by the alcohol correcting coefficient control section 41f for the purpose of correcting the air/fuel ratio. And, it also serves to feedback-correct the pulse width by an air/fuel ratio feedback correcting coefficient $\alpha$ set by the air/fuel ratio feedback correcting coefficient control section 41e in a manner to calculate a fuel injection pulse width Ti ($Ti = T_p \times COEF \times \alpha \times KAL$).

The fuel injection pulse width Ti is used for correcting the basic fuel injection pulse width $T_p$ and obtaining an actual fuel injection quantity to be supplied to the engine. It is set as a fuel injection pulse width against the PO injector 10b.

Function of Injector Driving Section Control Unit 43

The injector switching area determining section 43a serves to determine the current injector driving section based on an output signal of the injector selector 43g to be described later and set a comparison reference value As according to the determined section. And, it serves to determine the switching area of the PO injector 10b or both of the PO injector 10b and the AS injector 10a by comparing the comparison reference value As with the alcohol density A obtained by the alcohol density calculator 42.

If the injector selector 43g selects only the PO injector 10b, the reference value Ao (for example, 15% of alcohol density) read out of a predetermined address of the ROM 33 is assumed as the comparison reference value As.

If the injector selector 43g selects both of the AS injector 10a and the PO injector 10b, an offset value A1 (corresponding to 2 or 3 bits if minimum resolution to the alcohol density A is one bit, for example) is subtracted from the reference value Ao so as to define the comparison reference value As $(As=Ao-A1)$.

Figure 4:
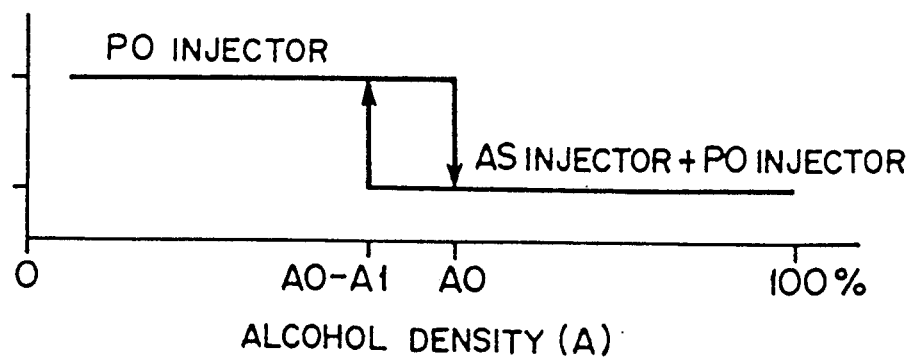
FIG. 4 is a view illustrating a switching timing of an injector to the alcohol density.

As shown in FIG. 4, the injector switching area determining section 43a serves to provide hysteresis matching to a predetermined offset value A1 to the fuel injection of the PO injector 10b only and the fuel injection switching area of both of the PO injector and the AS injector 10a for the purpose of preventing hunching caused when switching the fuel injection based on an error of the sensed alcohol density A.

If the injector switching area determining section 43a determines the alcohol density A is higher than the comparison reference value As $(A \geq As)$, the PO injector maximum fuel injection pulse width control section 43b reads the engine revolution number N calculated by the engine revolution number calculator 41b for obtaining a passage time T1 cycle per one cycle (2 revolutions of the engine, 720° CA) (T1 cycle=60/N+2) It means that the maximum fuel injection pulse width (time) supplied by the PO injector 10b matches to a passage time per one cycle.

And, the PO injector maximum fuel injection pulse width control section 43b serves to set the maximum fuel injection pulse width $T_{MAX}$ of the PO injector 10b based on the passage time T1 cycle per one cycle in accordance with the following expression;

$$T_{MAX} = T1 cycle \times C$$

wherein the coefficient C shown in the second term of the right side is 0.9 to 0.05, for example.

Assume that the maximum fuel injection pulse width $T_{MAX}$ of the PO injector 10b is a passage time T1 cycle per one cycle ($T_{MAX}$=T1 cycle). If the fuel injection pulse width T1 defined by the fuel injection pulse width control section 41g is equal to or larger than the maximum fuel injection pulse width $T_{MAX}$ (T1$\geq T_{MAX}$), the PO injector 10b is left open, thereby making the controllability inferior. In order to cope with the shortcoming, by multiplying the passage time T1 cycle per one cycle with the coefficient C, it is possible to prevent the controllability from being worsened.

The PO injector fuel injection ability determining section 43c serves to compare the maximum fuel injection pulse width $T_{MAX}$ defined by the PO injector maximum fuel injection pulse width control section 43b with the fuel injection pulse width Ti defined by the fuel injection pulse width control section 41g for determining whether or not the fuel injection pulse width Ti stays within the maximum fuel injection pulse width $T_{MAX}$.

If the PO injector fuel injection ability determining section 43c determines if the fuel injection pulse width Ti is equal to or larger than the maximum fuel injection pulse width $T_{MAX}$ (Ti$\geq T_{MAX}$), the AS injector fuel injection pulse width control section 43d serves to multiply the larger portion (Ti$-T_{MAX}$) of the fuel injection pulse width Ti than the maximum fuel injection pulse width $T_{MAX}$ with the correcting coefficient KAS for the purpose of setting the fuel injection pulse width about the AS injector 10a, that is, the AS injector fuel injection pulse width TiAS $(TiAS=(Ti-T_{MAX}) \times KAS)$.

The AS injector 10a has a different injection characteristic rather than the PO injector 10b. Hence, for setting the fuel injection quantity obtained in the fuel injection pulse width defined on the injection characteristic of the PO injector 10b to the fuel injection pulse width of the AS injector 10a, it is necessary to correct the fuel injection pulse width (Ti$-T_{MAX}$) with the correcting coefficient KAS obtained by the experiment with reference to both of the injectors 10a and 10b.

The AS injector fuel injection unstable area determining section 43e supplies the AS injector fuel injection pulse width TiAS defined by the AS injector fuel injection pulse width control section 43d and the fixed AS injector fuel injection pulse width TiASS of the AS injector 10a stored in the ROM 33 and compares the injection pulses TiAS with TiASS.

If the valve opening time of the AS injector 10a (pulse width) is quite short, the fuel injection quantity is likely to vary and the atomization of the fuel is made worse. The area where these matters are likely to occur is called an unstable area and the unstable area is obtained by an experiment based on the injector characteristic. The fuel injection pulse width TiASS of the fixed AS injector is set as a somewhat larger pulse width than the unstable area.

If the AS injector fuel injection unstable area determining section 43e determines the AS injector fuel injection pulse width TiAs is smaller than the fixed AS injector fuel injection pulse width TiASS, the PO injector fuel injection pulse width control section 43f reads the fuel injection pulse width Ti defined by the fuel injection pulse width control section 44g, supplies the fixed AS injector fuel injection pulse width TiASS stored in the ROM 33, correct the fixed AS injector fuel injection pulse width TiASS with a correcting coefficient Kpo, and subtracts the corrected width from the fuel injection pulse width Ti. The resulting pulse width is an actual fuel injection pulse width of the PO injector 10b, that is, the PO injector fuel injection pulse width Tipo $(Tipo=Ti-TiASS \times Kpo)$.

The correcting coefficient Kpo is used for correcting the fuel injection quantities of the AS injector 10a and the PO injector 10b to be the same under the same condition, though both injectors have respective injection characteristics. It was obtained by an experiment and has been stored in the ROM 33.

If the injector switching area determining section 43a that the alcohol density A is less than the comparison referenced value As (A<As) or the PO injector fuel injection ability determining section 43e determines that the maximum fuel injection pulse width TMAX defined by the PO injector maximum fuel injection pulse width control section 43b is larger than the fuel injection pulse width Ti defined by the fuel injection pulse width control section 41g (Ti<TMAX), the injector selector 43g serves to output a driving pulse signal having the fuel injection pulse width Ti to the PO injector 10b included in the corresponding cylinder through the PO injector driving section 43h on the basis of a predetermined timing. It results in only the PO injector 10b being able to inject the fuel.

Figure 5:
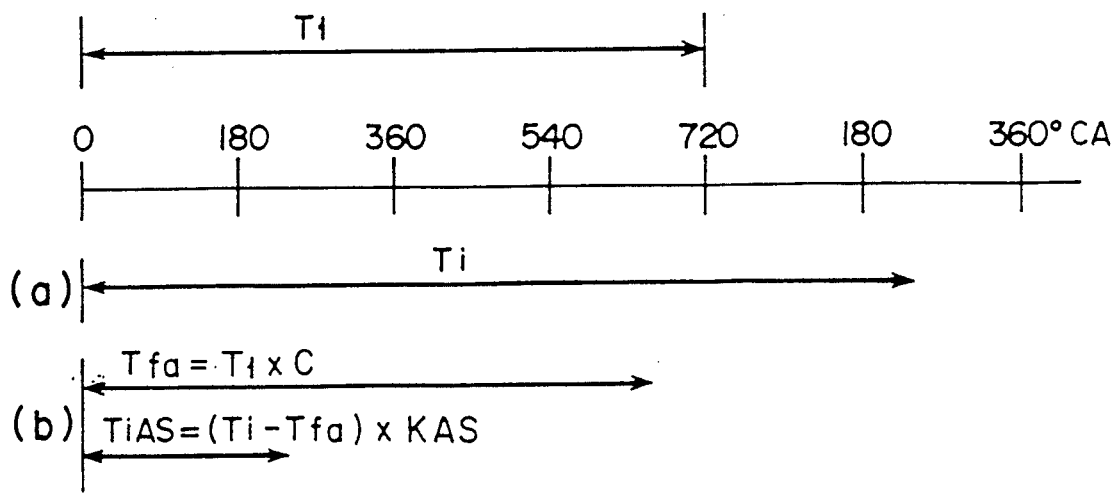

If the injector switching area determining section 43a determined A>As, the PO injector fuel injection ability determining section 43c determines Ti≦TMAX, and the AS injector fuel injection unstable area determining section 43e that the AS injector fuel injection pulse width TiAS defined by the A injector fuel injection pulse width control section 43d is equal to or than the fixed AS injector fuel injection pulse width TiASS (TiAS≧TiASS), the injector selector 43g serves to output the driving pulse signal having the maximum fuel injection pulse width TMAX defined by the PO injector maximum fuel injection pulse width control section 43b t the PO injector 10b included in the corresponding cylinder through the PO injector driving section 43h on the basis of a predetermined timing and output the AS injector fuel injection pulse width TiAS to the AS injector 10a on the basis of a predetermined timing (see FIG. 5).

If the injector switching area determining section 43a determines A>As and the PO injector fuel injection ability determining section 43c determines Ti≦TMAX, the injector selector 43g serves to output the driving pulse signal having the PO injector fuel injection pulse width Tipo defined by the PO injector fuel injection pulse width control section 43f to the PO injector 10b included in the corresponding cylinder through the PO injector driving section 43h on the basis of a predetermined timing and output the driving pulse signal having the fixed AS injector fuel injection pulse width TiASS used in the AS injector fuel injection unstable area determining section 43e to the same PO injector 10b through the AS injector driving section 43i (see FIG. 6).

Fuel Injection Quantity Control Procedure

Next, the direction will be directed to the fuel injection quantity control procedure of the foregoing control device 31 with reference to the flowchart shown in FIG. 7.

At a step S101, the control device 31 reads a crank pulse from the crank angle sensor 22 for calculating the engine revolution number N. Then, at a step S102, it calculates the intake air quantity Q based on an output signal of the intake air quantity sensor 8.

At a step S103, it defines the basic fuel injection pulse width Tp based on the engine revolution number N calculated at the step S101 and the intake air quantity Q calculated at the step S102 ($Tp = K \times Q/N$ $K$: a predetermined inverse number calculated by a theoretical air/fuel ratio given in case of using the 100%-gasoline fuel, an injection quantity characteristic of the PO injector 10b and the number of cylinders). Then, the process goes to a step S104.

At a step S104, the control device 31 reads a cooling water temperature Tw, a throttle opening angle θ, and an idle switch output. Then, proceeding to a step S105, it defines an increments correcting coefficient COEF about the cooling water temperature correction, accelerating or decelerating correction, increment correction at the full-open valve, and increment correction after idling based on the information about the engine driving state read at the step S104.

Then, at a step S106, it defines an air/fuel ratio feedback correcting coefficient α based on the output of the O2 sensor 27. At a step S107, it calculates an alcohol density A based on the output signal of the alcohol density sensor 14.

At a step S108, it defines an alcohol correcting coefficient KAL based on the alcohol density A calculated at the step S107.

Proceeding to a step S109, it corrects the basic fuel injection pulse width Tp defined at the step S103 for calculating a fuel injection pulse width Ti based on the increments correcting coefficient COEF defined at the step S105, the air/fuel ratio feedback correcting coefficient α defined at the step S106, and the alcohol correcting coefficient KAL defined at the step S108 ($Ti = Tp \times COEF \times \alpha \times KAL$).

Next, at a step S110, it determines whether or not the injector driving section determining flag FLAG is φ, that is, the injector(s) used at the previous routine is both of the AS injector 10a and the PO injector 10b or only the PO injector 10b.

If the flag FLAG=φ, that is, it determines the injector driven at the previous routine is only the PO injector 10b, the process goes from steps S110 to S111 at which it reads a reference value Ao at a predetermined address of the ROM 33 and assumes the reference value Ao as the comparison reference value As (As←Ao). Then, the process goes to a step S113.

On the other hand, if the flag FLAG=1, that is, both of the AS injector 10a and the PO injector 10b are driven at the previous routine, the process goes to a step S112 at which the control device 31 subtracts the predetermined offset value A1 from the reference value Ao and consumes the resulting value as the comparison reference value As (As←Ao−A1). Then, the process goes to the step S113.

If the control device 31 determines that the alcohol density A calculated at the step S107 is smaller than the comparison reference value As defined at the step S112 (A<As), the process goes from the step S113 to S114. At the step, the control device 31 outputs a driving pulse signal having a fuel injection pulse width Ti defined at the step S109 to the PO injector 10b included in the corresponding cylinder on the basis of the predetermined timing. Then, at a step S115, it clears the injector driving section determining flag FLAG (FLAG←φ) and then finishes the routine.

At the step S113, on the other hand, if A≧As is determined, the process goes from the step S113 to a step S116 at which a passage time T1cycle per one cycle (720° C.) is set on the engine revolution number N calculated at the step S101 (T1cycle←(60/N)×2).

And, at a step S117, the control device 31 serves to multiply the passage time T1cycle per one cycle calculated at the step S116 with the correcting coefficient C (for example, C=0.9~0.95) and define the maximum fuel injection pulse Width TMAX for the PO injector 10b (TMAX←T1cycle×C).

Next, at a step S118, the control device 1 compares the fuel injection pulse width Ti with the maximum fuel injection pulse width $T_{MAX}$ defined at the step S117. If Ti≧TMAX, the process goes to a step S119. If Ti≧TMAx, only the fuel injection of the PO injection can reach a sufficient value. Then, the process returns to the step S114.

At the step S118, if Ti≧TMAX, that is, the fuel injection of the PO injector 10b cannot reach a sufficient value, the process goes to a step S119. For obtaining an injection pulse of the AS injector 10a, the control device 31 serves to subtract the maximum fuel injection pulse width TMAX from the fuel injection pulse width Ti defined at the step S109. It multiplies the resulting value with the correcting coefficient KAS obtained on the injector characteristic and assume the resulting value as the AS injector fuel injection pulse width TiAS (TiAS←(Ti−TMAX)×KAS).

Then, at a step 120, the control device 31 serves to compare the AS injector fuel injection pulse width TiAS defined at the step S119 with the fixed AS injector fuel injection pulse width TiASS. The width TiASS has been defined for determining whether or not the pulse width TiAS stays within the unstable area. If TiAS≧TiASS, the process goes to a step S121 and if TiAS<TiASS, the process goes to a step S122.

At the step S121, the control device 31 serves to output a driving pulse having the maximum fuel injection pulse width TMAX defined at the step S117 to the PO injector 10b included in the corresponding cylinder on the basis of the predetermined timing. And, it also serves to output the driving pulse signal having the AS injector fuel injection pulse width TiAS defined at the step S119 to the AS injector 10a on the basis of the predetermined timing.

At the step S122, on the other hand, the control device 31 serves to read the fixed AS injector fuel injection pulse width TiASS of the AS injector 10a from the ROM 33 and correct the fixed AS injector fuel injection pulse width TiASS with the correcting coefficient Kpo. Then, it subtracts the fuel injection pulse width Ti defined at the step S109 from the corrected value and defines the port injector fuel injection pulse width Tipo to the PO injector 10b (Tipo=Ti−TiASS×Kpo).

At a step S123, it outputs a driving signal having the port injector fuel injection pulse width Tipo defined at the step S122 to the PO injector 10b on the predetermined timing. And, it also outputs the fixed AS injector fuel injection pulse width TiASS to the AS injector 10a on the basis of the predetermined timing.

Then, at a step S124, the control device 31 sets the injector driving section determining flag FLAG (FLAG=1) and finishes the routine.

The control device 31 serves to drive the AS injector 10a and the PO injector 10b to inject the fuel for meeting the fuel injection quantity required by the engine, near the area wherein the 100%-alcohol fuel provides the maximum output, that is, in the area wherein it requires about twice as large an injection quantity as the 100%-gasoline fuel. In an area wherein the idling drive in case of the 100%-gasoline fuel requires a small fuel injection quantity, the fuel injection quantity of only the PO injector 10b reaches the sufficient injection characteristic. It results in obtaining a quite wide dynamic range from the maximum fuel injection quantity to the minimum fuel injection quantity.

As mentioned above, if the fuel injection pulse defined on the engine state parameter and the alcohol density of the fuel is longer than the maximum fuel injection pulse width of the port injector, the present invention is designed to drive the port injector and the injector located in the intake pipe assembly portion with the intake pipe assembly portion injector fuel injection pulse width defined on the longer fuel injection pulse width. Hence, it is capable of sufficiently meeting the fuel injection quantity required by the engine even when the engine is driven with the 100%-gasoline fuel to supply a high output, thereby being able to expand the dynamic range.

Further, the invention offers a constantly stable fuel injection performance in all the driving areas even though the fuel has any alcohol density, resulting in improving engine stability, exhaust gas purifying performance, and engine output performance.

And, it further offers an excellent effect that the manufacturing cost can be reduced, since no special injector is used.

The scope of the invention is not limited to the scope disclosed in the foregoing embodiments, but it is limited to the disclosure of the claims.

While the presently preferred embodiment of the present invention has been shown and described, it is to be understood that this disclosure is for the purpose of illustration and that various changes and modifications may be made without departing from the scope of the invention as set forth in the appended claims.

We claim:

1. A fuel injection quantity control device for an alcohol engine enabled to be driven by a mixed fuel of gasoline and alcohol, including a plurality of cylinders, port injectors facing to the intake ports provided in said cylinders, and an intake pipe assembly portion injector provided in an intake pipe assembly portion, and being designed to control a fuel injection quantity with said injector, said fuel injection quantity control device comprising;

a rotation quantity sensor mounted to said engine, an engine revolution number calculator means for obtaining a speed of said engine based on the output of said rotation quantity sensor, a port injector maximum fuel injection pulse width control means for defining the maximum fuel injection pulse width of said port injector based on the speed of said engine, a density sensor for sensing an alcohol density in said fuel, a parameter sensing means for sensing a parameter indicating the state of said engine, a fuel injection pulse width control means for defining a fuel injection pulse width in dependency on the outputs of said density sensor and parameter sensing means, a port injector injection ability determining means for comparing said fuel injection pulse width with said maximum fuel injection pulse width and determining whether or not said fuel injection pulse width is shorter than said maximum fuel injection pulse width, an intake pipe assembly portion injector fuel injection pulse width control means for defining an intake pipe assembly portion injector fuel injection pulse width for an intake pipe assembly portion injector in dependency on the difference between said fuel injection pulse width and said maximum fuel injection pulse width if said determining means determines that said fuel injection pulse width is longer than said maximum fuel injection pulse width, and an injector selector means for supplying the fuel injection pulse width defined by said fuel injection pulse width control means if said determining means determines that said fuel injection pulse width is shorter than said maximum fuel injection pulse width and supplying said maximum fuel injection pulse width to said port injector and said intake pipe assembly portion injector fuel injection pulse width to said intake pipe assembly portion injector if said determining means determines that said fuel injection pulse width is longer than said maximum fuel injection pulse width.

2. The fuel injection control device as claimed in claim 1, further comprising a data storing means for storing correction data used to equalize the fuel injection quantity of said port injector to that of said intake pipe assembly portion injector.

3. The fuel injection control device as claimed in claim 1, wherein said maximum fuel injection pulse width is a result of multiplying a passage time per one cycle of said engine with a predetermined correcting coefficient.

* * * * *